(12) United States Patent
Robinson et al.

(10) Patent No.: US 11,084,558 B2
(45) Date of Patent: Aug. 10, 2021

(54) INTEGRATED OFFSHORE RENEWABLE ENERGY FLOATING PLATFORM

(71) Applicant: Excipio Energy, Inc., Houston, TX (US)

(72) Inventors: Roy Robinson, Houston, TX (US); Georg Engelmann, Houston, TX (US)

(73) Assignee: Excipio Energy, Inc., Houston, TX (US)

( * ) Notice: Subject to any disclaimer, the term of this patent is extended or adjusted under 35 U.S.C. 154(b) by 0 days.

(21) Appl. No.: 16/503,450

(22) Filed: Jul. 3, 2019

(65) Prior Publication Data

US 2020/0010155 A1 Jan. 9, 2020

Related U.S. Application Data

(60) Provisional application No. 62/693,905, filed on Jul. 3, 2018.

(51) Int. Cl.
*B63B 35/44* (2006.01)
*B63B 21/50* (2006.01)

(52) U.S. Cl.
CPC ......... *B63B 35/4406* (2013.01); *B63B 21/50* (2013.01); *B63B 2021/501* (2013.01);
(Continued)

(58) Field of Classification Search
CPC ............... B63B 35/4406; B63B 21/50; B63B 2021/501; B63B 2035/446; B63B 2035/4466; B63B 2035/442; B63B 75/00; B63B 77/00; B63B 77/10; Y02E 10/727; F03B 13/16; F03B 17/061; F03B 13/142;
(Continued)

(56) References Cited

U.S. PATENT DOCUMENTS 3,273,526 A 9/1966 Glosten
3,673,973 A 7/1972 Glosten
(Continued)

OTHER PUBLICATIONS

International Search Report and Written Opinion (ISA 210 and ISA 237) PCTUS 1940655, dated Nov. 8, 2019.
(Continued)

*Primary Examiner* — Anthony D Wiest
(74) *Attorney, Agent, or Firm* — Charles Knobloch (57) ABSTRACT

Systems and methods are presented for deploying and using a floating platform using articulated spar legs used as a type of hull, each of the spar legs attached to the floating platform by an articulated connection. Each of the articulated spar legs being moveable from a horizontal to a vertical position, horizontal for transport and vertical for deployment of the floating platform. The articulated spar legs serve to support the floating position of the floating platform. The articulated spar legs are moved from horizontal to vertical position by controlling ballast imposed upon or within spar legs. Each of the articulated spar legs are moveable from a vertical to a horizontal position with a ballast changing method. Systems and methods are presented for extracting natural renewable energy from the environment surrounding the floating platform with energy capture devices modularly affixed to the platform and energy capture devices incorporated into the articulated spar legs.

3 Claims, 4 Drawing Sheets

(52) U.S. Cl.
CPC ... *B63B 2035/442* (2013.01); *B63B 2035/446* (2013.01); *B63B 2035/4466* (2013.01)

(58) Field of Classification Search
CPC .. F03B 1/00; F03D 13/25; F03D 9/008; F05B 2240/93
See application file for complete search history.

(56) References Cited

U.S. PATENT DOCUMENTS

| | | | |
|---|---|---|---|
| 3,708,985 A | 1/1973 | Pogonowski et al. | |
| 3,762,352 A | 10/1973 | Brahtz | |
| 3,912,938 A | 10/1975 | Filipenco | |
| 4,266,403 A | 5/1981 | Hirbod | |
| 4,271,668 A | 6/1981 | McCormick | |
| 4,286,538 A | 9/1981 | Matsui | |
| 4,930,924 A | 6/1990 | Hunt | |
| 5,549,445 A | 8/1996 | Schremp | |
| 5,799,603 A | 9/1998 | Tellington | |
| 6,012,873 A | 1/2000 | Copple et al. | |
| 6,425,710 B1 | 7/2002 | Khachaturian | |
| 6,435,773 B1 | 8/2002 | Khachaturian | |
| 6,435,774 B1 | 8/2002 | Khachaturian | |
| 6,564,741 B2 | 5/2003 | Nelson | |
| 6,692,190 B2 | 2/2004 | Khachaturian | |
| 6,719,495 B2 | 4/2004 | Khachaturian | |
| 6,766,643 B2 | 7/2004 | Christensen | |
| 7,226,328 B1 | 6/2007 | Puzella et al. | |
| 7,352,078 B2 | 4/2008 | Gehring | |
| 7,585,131 B2 | 9/2009 | Oigarden et al. | |
| 7,750,491 B2 | 7/2010 | Sankrithi | |
| 7,994,649 B2 | 8/2011 | Abatemarco | |
| 8,030,789 B2 | 10/2011 | Ortiz | |
| 8,129,852 B2 | 3/2012 | Edwards et al. | |
| 8,362,263 B2 | 1/2013 | Cho et al. | |
| 8,362,631 B2 | 1/2013 | Roe et al. | |
| 8,441,139 B2 | 5/2013 | Karimi | |
| 8,596,955 B2 | 12/2013 | Freeman et al. | |
| 8,624,416 B2 | 1/2014 | Wille et al. | |
| 8,698,338 B2 | 4/2014 | Slocum et al. | |
| 8,803,346 B2 | 8/2014 | Pitre et al. | |
| 8,839,734 B2 | 9/2014 | Khachaturian | |
| 8,956,103 B2 | 2/2015 | Gehring | |
| 9,039,326 B1 | 5/2015 | Novek | |
| 9,080,554 B2 | 7/2015 | Royseth | |
| 9,181,922 B2 | 11/2015 | Dib Echeverria | |
| 9,297,350 B2 | 3/2016 | Wille et al. | |
| 9,347,425 B2 | 5/2016 | Wright | |
| 9,352,807 B2 | 5/2016 | Tunbjer | |
| 9,623,935 B2 * | 4/2017 | Huenefeld | B63B 39/005 |
| 9,624,111 B2 | 4/2017 | Novek | |
| 9,764,804 B1 | 9/2017 | Kennamer, Sr. | |
| 9,815,531 B2 * | 11/2017 | Khachaturian | B63B 75/00 |
| 9,849,941 B2 | 12/2017 | Huenefeld | |
| 10,399,648 B1 | 9/2019 | Kennamer, Sr. | |
| 2004/0037651 A1 * | 2/2004 | Khachaturian | B63B 1/14 405/203 |
| 2015/0322640 A1 | 11/2015 | Wu | |

OTHER PUBLICATIONS

Jan Erik Hanssen et al, Design and performance validation of a hybrid offshore renewable energy platform, Proceedings of the Tenth International Conference on Ecological Vehicles and Renewable Energies (EVER), Mar. 31-Apr. 2, 2015, Paper No. 15180221, Monte Carlo, Monaco.

Kyong-Hwan Kim et al, Conceptual Design of 10MW Class Floating Wave-Offshore Wind Hybrid Power Generation System, Proceedings of the Twenty-fifth International Ocean and Polar Engineering Conference, Jun. 21-26, 2015, pp. 737-743, Kona, Big Island, Hawaii, USA.

M.Z. Ibrahim et al, WWS Hybrid Tri-Renewable Power System to Generate Electricity (WWS: Wave.Wind.Solar), Advanced Science Letters, vol. 21, 2015, pp. 3632-3634, Eastern Corridor Renewable Energy (ECRE), School of Ocean Engineering, Universiti Malaysia Terengganu, 21030, Kuala Terengganu, Malaysia.

Carlos Perez-Collazo et al, A Novel Hybrid Wind-Wave Energy Converter fo Jacket-Frame Substructures, Energies, 2018 vol. 11-637, School of Engineering, University of Plymouth, Reynolds Building, PL4 8AA Plymouth, UK.

Jocelyn Maxine Kluger, Synergistic Design of a Combined FloatingWind Turbine -Wave Energy Converter, PhD Dissertation, 2017, Massachusetts Institute of Technology 2017.

Nicolas Tomey-Bozo, Jimmy Murphy, Tony Lewis, Gareth Thomas; "A review and comparison of offshore floating concepts with combined wind-wave energy"; Proceeding of the 11th European Wave & Tidal Energy Conference (EWTEC); Sep. 2015; Nantes, France.

* cited by examiner

INTEGRATED OFFSHORE RENEWABLE ENERGY FLOATING PLATFORM

This application claims priority to U.S. Provisional Application Ser. No. 62/693,905 to Robinson, et al of filing date Jul. 3, 2018.

TECHNICAL FIELD

Disclosed herein are improvements in offshore renewable energy floating platforms, in particular multi-spar-type hull supported platforms which are modularly configurable to receive one or more different energy capture devices and having spar-type hulls which may be articulated for assembly, transport, and deployment. This allows for assembly in shallow water while providing a stable energy platform once the Articulated-Spar-Legs are deployed in deeper water and the platform moorings are installed.

BACKGROUND

Bundling of offshore renewable energy technology brings operational revenue advantage in terms of availability (i.e. produces power over a greater percentage of a given period of time) due to uncoupled energy capture systems that tap both local/real-time energy due to ambient winds, as well as far-field/background mechanisms (swell, currents at depth and temperature gradient) and reliability due to the diversity of systems and redundancy/population of devices. The combination of devices increases the capital efficiency of each device by sharing common costs such as moorings, thereby reducing the overall cost of energy produced.

This invention relates in general to an integrated offshore renewable energy platform supporting wind turbines, wave energy devices, and/or ocean flow energy devices, and/or ocean thermal energy conversion systems.

In particular, this invention relates to a platform that is constructible in a protected harbor or shipyard, but when installed has the floating characteristics of a deep draft spar, with the deck space characteristics of a barge or semi-submersible type hull.

Modularity in design allows for industrial production which has advantages in terms of the supply chain and capital efficiency that can be tapped given it leverages inter-modal capacity of the existing offshore wind industry.

A significant difference between this design and prior art is the ability of the Articulated-Spar-Legs to act as a stable buoyant platform during construction and transport, eliminating the need for other sources of buoyancy such as other vessels, barges, or temporary floats.

BRIEF DESCRIPTION OF THE DRAWINGS

FIGS. 2A, 2B, 2C illustrate 3-D perspective views showing example deck configurations for different numbers of articulated spar legs.

FIGS. 3A, 3B illustrate 3-D perspective views showing an articulated spar leg example in stowed, horizontal and deployed, vertical positions.

FIGS. 4A, 4B, 4C illustrates plan views looking downwards, showing examples of the topsides hull platform with example deck configurations for different numbers of articulated spar legs, the articulated spar legs attached and articulated into horizontal position.

DETAILED DESCRIPTION OF THE INVENTION

U.S. Application Ser. No. 62/693,905 to Robinson, et al and filed Jul. 3, 2018 is hereby incorporated by reference.
Introduction.

The majority of offshore renewable energy structures rely on one, or at most, two modes of energy capture in a common supporting structure. The most often used device is a wind turbine. In some instances, a wave energy capture device or ocean current energy device are combined with the wind turbine on a shared supporting structure. An example of the device disclosed herein is a system that is designed to allow for various configurations that may, as conditions dictate, capture wind, wave, ocean current energy, and/or host an Ocean Thermal Energy Conversion plant (commonly referred to as OTEC) integrated into one floating offshore platform. A breakthrough realization by the inventors is to provide spar legs attached to the platform structure through an articulating joint, while also having the articulating spar legs serve a hull.

In one example, the design is based on a building block principle, or modularity that can incorporate existing energy capture technologies in a novel way, allowing flexibility in system selection for each platform to be optimized and/or pre-engineered for the site-specific conditions to maximize power outputs, hence revenue capture. Applying this principle to the deck structure; in addition to, or instead of, OTEC and/or other devices without limitation could be included: examples of which are power-to-fuel plants, hydrogen production facilities, battery storage, or pumped storage.

Distinguished from other platform designs, the designs disclosed herein are modular in a way that is to a large extent independent or agnostic to the specific energy capture devices used, can be constructed and installed more efficiently, and will produce power across a broader range of sea states than other prior art. This hull form concept grants capital efficiency thru constructability, leveraging supply chain, and synergy with existing industrial infrastructure.

In one example, the design relies on three (3) or more Articulated-Spar-Legs, each comprised of one or more buoyancy cans, connected to an upper hull, or superstructure via a gimbal, universal joint, or pin type device. The resulting platform will: be more stable than a single Articulated-Spar-Leg; be ideal for the support of wind turbines, either horizontal or vertical axis; have the deck space and in-port constructability of a semi-submersible or barge type platform, and; offer unique benefits with regards to the capture of marine energy other than wind via inclusion of wave and/or current energy capture devices, and/or OTEC (ocean thermal energy conversion). All the necessary and companion equipment and risers are receivable, supportable by the payload capacity and can be included in the deck arrangement.

The freely swinging Articulated-Spar-Legs, with a very low heave response, allow for the capture of wave and ocean flow energy in ways a semi-submersible or mono-spar hull could not.

Disclosure of Components.

For convenience, the component numbering as shown in the figures are detailed below.

Figure 1:
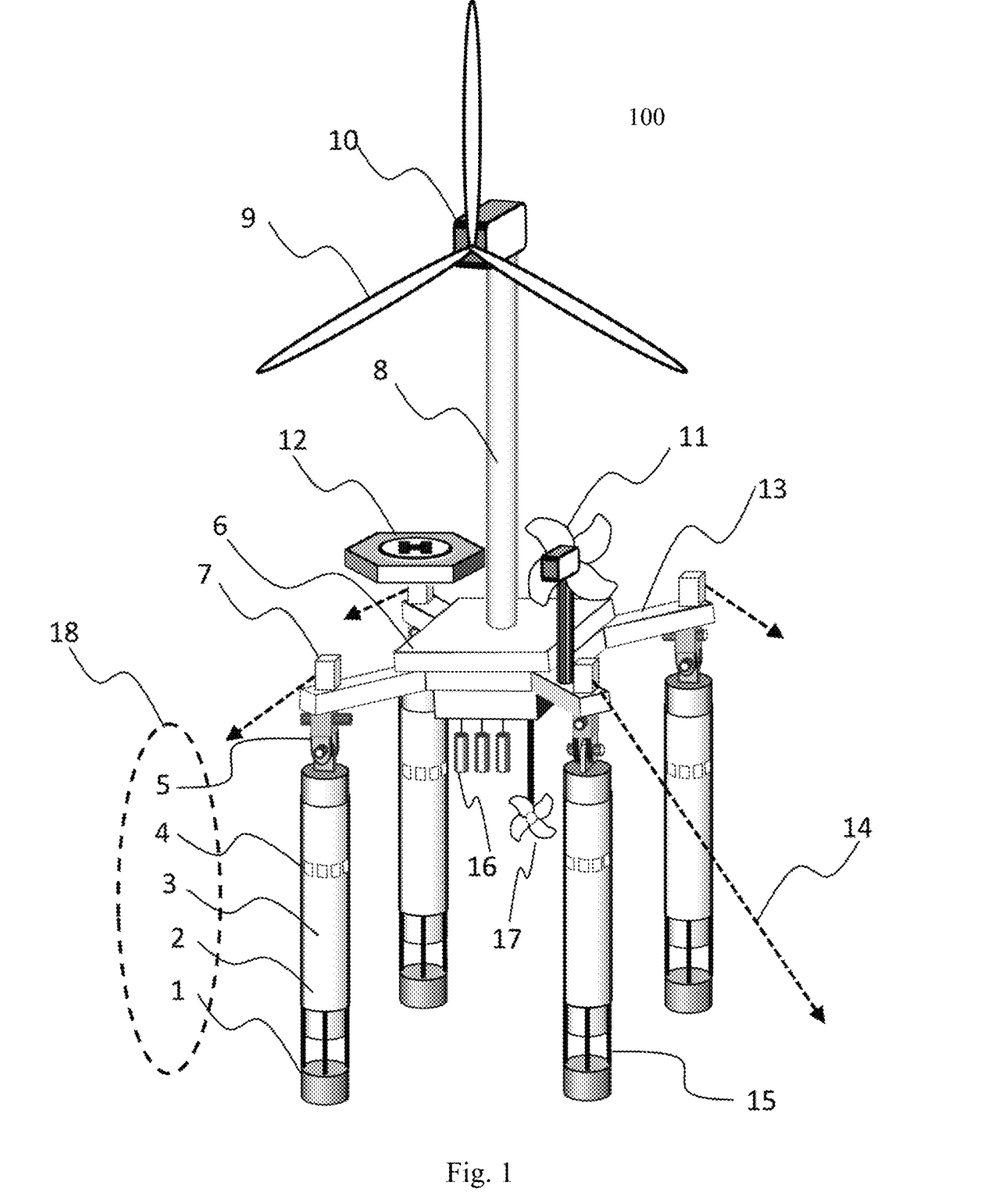
FIG. 1 illustrates a 3-D perspective view showing a first example of the platform in an operational configuration, Articulated-Spar-Leg assemblies deployed in the vertical position for offshore operation.

FIG. 1 is a representation of one example of the platform in an operation configuration. The components, as numbered, are shown in FIG. 1 as follows:
1. Flow Energy Converter—operational configuration (When included)
2. Variable Ballast
3. Articulated-Spar-Leg Hull
4. Oscillating Water Column Wave Energy Capture section
5. Freely Rotating Joint
6. Topsides Space for Equipment (OTEC, substation, and/or other system components)
7. Mooring Energy Capture Device, one per mooring attachment (when included)
8. Horizontal Wind Turbine Tower (can be replaced with vertical wind turbine)
9. Horizontal Wind Turbine Blades
10. Horizontal Wind Turbine Nacelle
11. Direct Drive Small Wind Turbine, one shown for clarity, more are possible
12. Helideck Access (optional)
13. Deck Structure
14. Mooring Lines
15. Extendable mount for Flow Energy Converter (when included), operational position shown
16. Point Absorber Wave Energy Capture devices—stowed in Topsides (6) when in port, for transport, or at sea for repair.
17. Surface Flow Energy Converters shown in deployed configuration for operations (when included)—stowed in Topsides (6) in port, for transport, or repair
18. Articulated-Spar-Leg assembly, in this example, comprising a flow energy converter (1), a variable ballast (2), an articulated spar leg body which is a hull (3), an oscillating water column wave energy capture section (4), and a freely rotating joint (5) for articulation of the articulated spar leg assembly relative to the deck structure (13).

Figure 2A:
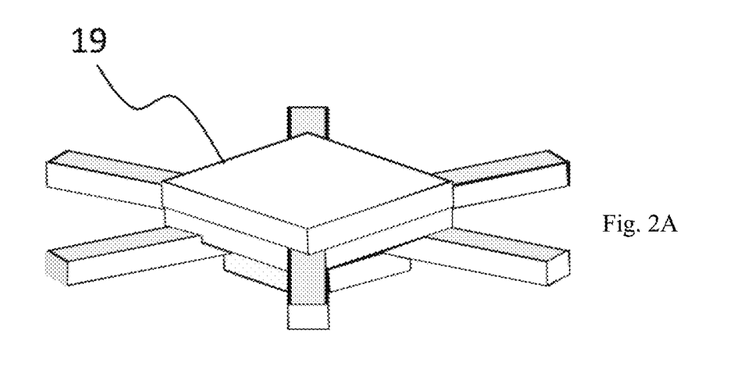
FIG. 2A illustrates a deck configuration for receiving six articulated spars.
Figure 2B:
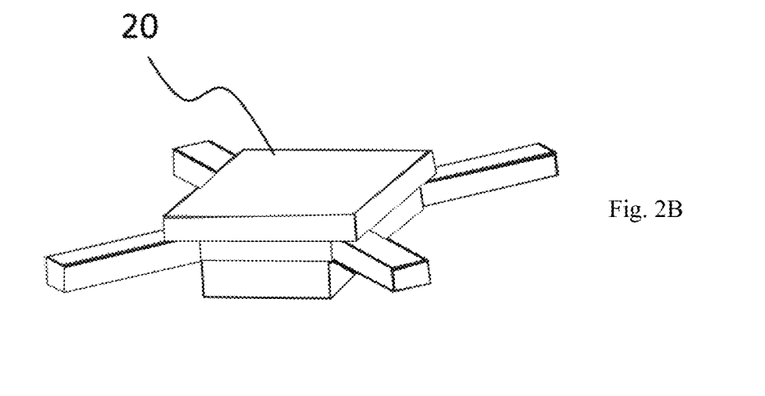
FIG. 2B illustrates a deck configuration for receiving four articulated spars.
Figure 2C:
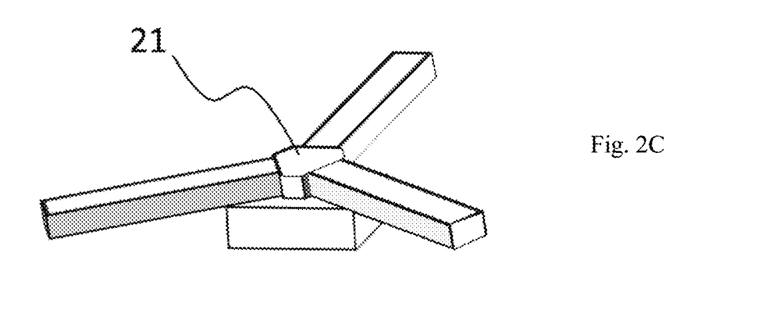
FIG. 2C illustrates a deck configuration for receiving three articulated spars.

FIGS. 2A, 2B, 2C are representations of example deck structures configured for variable numbers of Articulated-Spar Legs. Other configurations are possible and those shown do not imply a limit on the number of possible Articulated-Spar-Legs. In one example, this allows for a single articulate spar leg engineering design that can be applied different platforms of widely varying load requirements. Different deck loads can each use these articulate spar legs without altering the Articulated-Spar-Leg dimensions or function. This is achieved by the simple method of adding or subtracting Articulated-Spar-Legs. While the figures show 3, 4, and 6 leg configurations this is not meant to imply a limit on the maximum number of articulated spar-legs. In one example, a minimum for a stable platform is three (3) legs.

The components, as numbered, are shown in FIGS. 2A, 2B, 2C as follows:
19. Is a six (6) leg configuration that would allow for larger wind turbines and/or more wave energy capture and/or increased deck load.
20. Is the four (4) leg configuration shown in FIG. 1
21. Is a three (3) leg minimum for a stable platform.

Figure 3A:
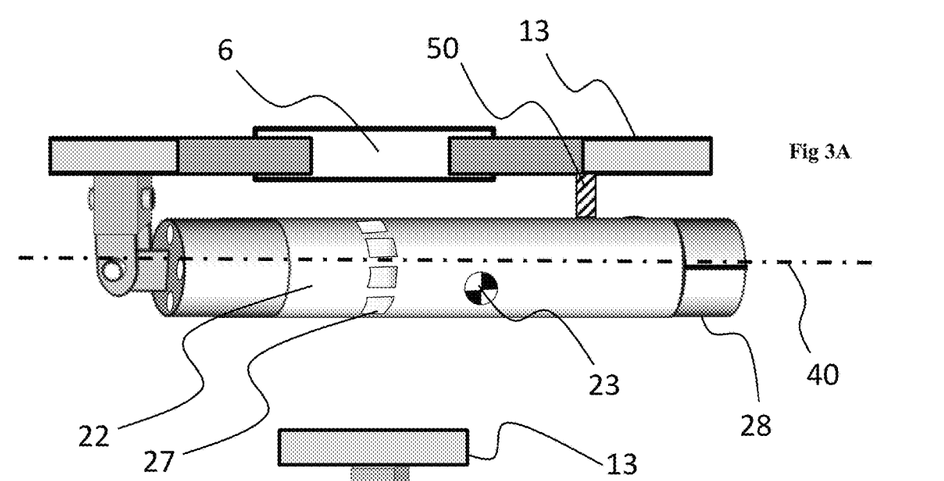
FIG. 3A illustrates an example articulated spar leg in a raised, shallow (horizontal) position, at a 90 degree articulation.
Figure 3B:
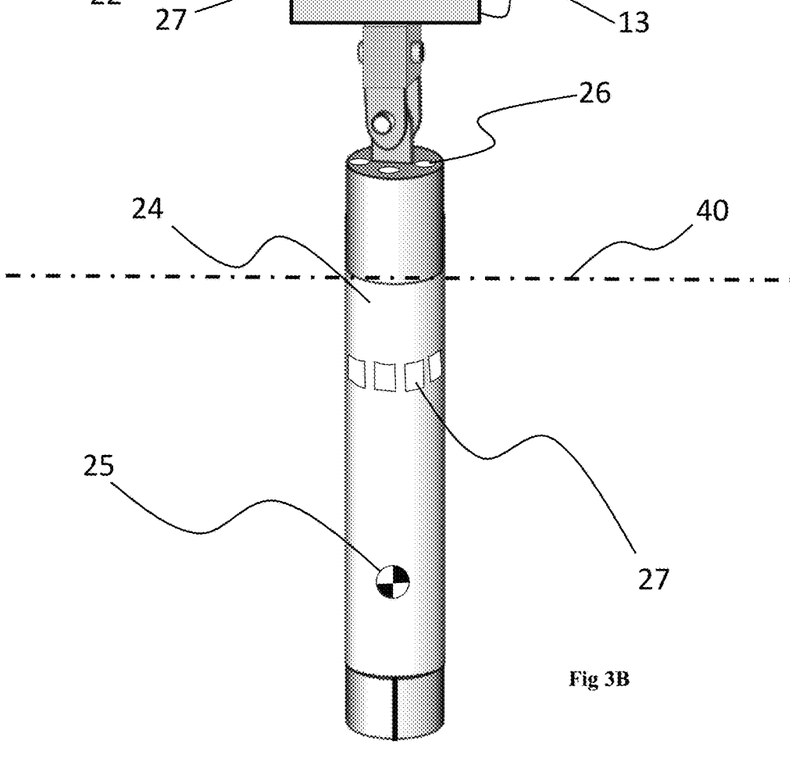
FIG. 3B illustrates an example articulated spar leg in an extended, (horizontal) position, at extended or no articulation.

FIGS. 3A, 3B are a more detailed representation of an example of the Articulated-Spar-Leg assembly (18). FIGS. 3A, 3B illustrate the Articulated-Spar-Leg details, including the approximate location of the center of gravity of the leg in its horizontal construction and transport and vertical deployed positions. The components, as numbered, are shown in FIGS. 3A, 3B as follows:
22. The Articulated-Spar-Leg (18) in horizontal shallow draft or transport configuration
23. Approximate Center of Gravity of the Articulated-Spar-Leg (18) in shallow draft or transport configuration
24. The Articulated-Spar-Leg (18) in the vertical deployed configuration
25. Approximate Center of Gravity of the Articulated-Spar-Leg (18) in deployed configuration
26. Oscillating Water Column device air vents, closed when in transport configuration (22), open once deployed (24)
27. Oscillating Water Column device sea chest, closed when in transport configuration (22), open once deployed (24)
28. Articulated-Spar-Leg mounted ocean flow device (when included) shown raised into Articulated-Spar-Leg (18) when not in use or for transport.

Figure 4A:
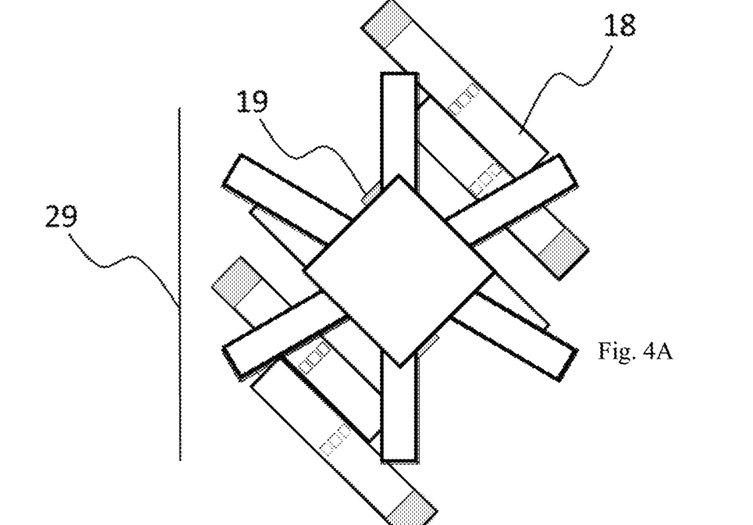
FIG. 4A illustrates an example topsides hull platform configured for receiving six articulated spars and the positioning and arrangement of the articulated spar legs articulated into horizontal positions.
Figures 4B, 4C:
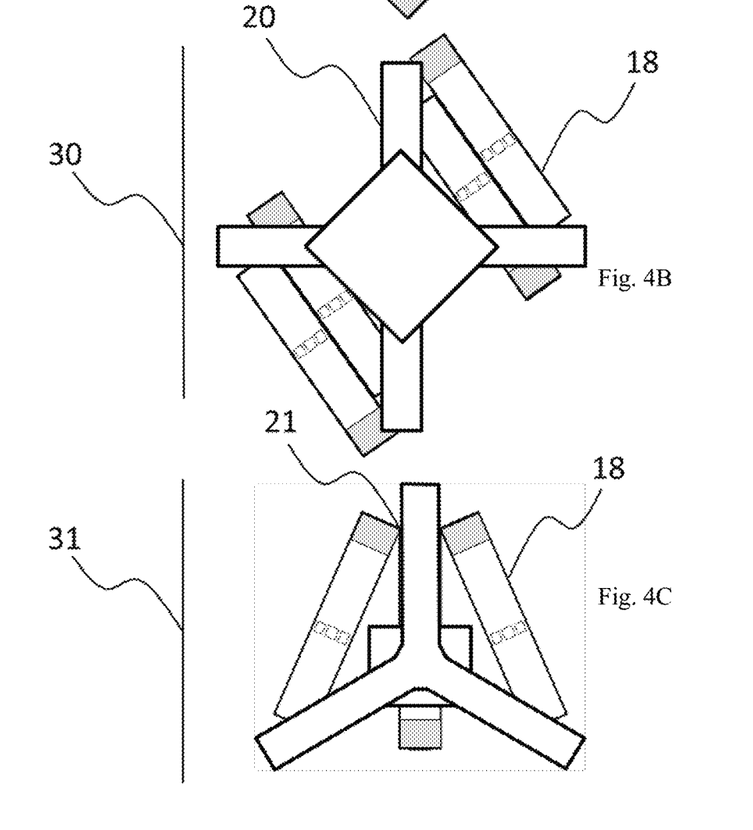
FIG. 4B illustrates an example topsides hull platform configured for receiving four articulated spars and the positioning and arrangement of the articulated spar legs articulated into horizontal positions.
FIG. 4C illustrates an example topsides hull platform configured for receiving three articulated spars and the positioning and arrangement of the articulated spar legs articulated into horizontal positions.

FIGS. 4A, 4B, 4C illustrate plan views looking downwards, showing examples of the topsides hull platform with example deck configurations for different numbers of articulated spar legs, the articulated spar legs attached and articulated into horizontal position. This figures are representations of the platform in shallow draft and transport configuration used during in-port construction and allows for the platform to be pulled alongside a typical pier. The spar-type hull leg assemblies are arranged and positioned for shallow draft and transport configurations. Arranged in this raised position, the articulated spar legs can be termed to be in a construction position or termed to be in a transport position.

The components, as numbered, are shown in FIGS. 3A, 3B as follows:
29. Is the six (6) leg option configuration using the deck structure shown in (19)
30. Is the four (4) leg option configuration using the deck structure shown in (20)
31. Is the three (3) leg option configuration using the deck structure shown in (21).

DETAILED DESCRIPTION—COMPONENT EXAMPLES

In one example, the integrated offshore renewable energy floating platform is a system that is designed to capture wind, wave, ocean current energy, and where conditions allow include ocean thermal energy conversion (commonly referred to as OTEC) integrated into one floating offshore platform. The following paragraphs describe the function and examples of the various system components.

Flow Energy Converter (1)

In one example, a Flow Energy Converter (1) is located below the sea surface and captures energy from the passing sea current via bladed or impulse turbine mechanism integrated to an electrical AC generator. The sea currents actuating the turbine mechanism may be either ambient flow as driven by the action of the wind or the tide or may be induced current due to the motion of the Articulated-Spar-Leg (18) to which they are attached.

Variable Ballast (2)

The Ballast (2) is a mass of dense material utilized to alter the center of gravity of the Articulated-Spar-Leg (18) and maintain overall Articulated-Spar-Leg (18) stability. In one example, the Ballast is adjustable such that the buoyant stability of the Articulated-Spar-Leg (18) is altered from neutral to positive as required for either the installation and transport or operational configuration.

Articulated-Spar-Leg Buoyancy (3)

The Spar Hull(s) (3) provide the buoyant support for the Articulated-Spar-Leg (18) and thereby the Integrated Offshore Renewable Energy Floating Platform and may be utilized in either the horizontal orientation as for outfitting, installation and transport, or rotated to the vertical orientation for platform operations.

Oscillating Water Column Wave Energy Capture (4)

In one example, an Oscillating Water Column Wave Energy Capture System (4) is integrated into to the Articulated-Spar-Leg (18) and is comprised of the upper hollow and free flooded section of the Articulated-Spar-Leg (18), which forms a free surface piston which rises and falls with passing waves due to the open sea chest (27) in turn compressing and expelling air toward the upper end of the Articulated-Spar-Leg (18) where, in one example, there is located a reversing air turbine intake and exhaust the passage of air (26) through which actuates a rotary turbine which is linked to an electrical generator, thereby producing power due to the passing waves.

Freely Rotating Joint (5)

A Freely Rotating Joint (5) provides the structural and mechanical connection of the Articulated-Spar-Legs (18) to the Deck Structure (13) and provide for unrestrained X-Y axis rotation of the Articulated-Spar-Legs (18) relative to the Deck Structure (13) which they support. Likewise allowing the Articulated-Spar-Leg (18) to be rotated to a full horizontal orientation to accommodate the construction and towing of the platform in shallow water.

Topsides Hull Space for Equipment or OTEC system components (6)

In one example, the Topsides Hull Space (6) is configured for modular outfitting of renewable energy system equipment and supporting power systems, and in one example, as well as OTEC (ocean thermal energy conversion) system components including piping, pumps, liquid vessels, heat exchangers and other modular packages as required for the operation of the various renewable energy systems mounted to the integrated offshore renewable energy floating platform.

Mooring Energy Capture Device(s) (7)

In one example, Mooring Energy Capture Devices (7) are connected to the platform mooring lines (14) and extract energy via the varying tension occurring within the mooring lines as the platform is acted upon by the ambient waves and currents impinging upon the structure inducing platform motions. In one example, the varying Mooring Line (14) tensions serve to actuate an energy capture mechanism via either a spring and flywheel or linear generator, which is mounted to the Deck Structure (13).

Horizontal Wind Turbine Tower (8)

In one example, a conventional wind tower (8) is the mast structure supporting Horizontal Wind Turbine Nacelle (10) and Horizontal Wind Turbine Blades (9) at an elevation above the Deck Structure (13) to which it is mounted and, in one example, is comprised of a structural tubular section either of constant or tapered dimension across its length. In one example, the conventional wind tower hosts an elevator or access ladder to facilitate turbine maintenance as well as serve as a compartment for interconnecting cables between the equipment located in the Nacelle (10) and the Deck Structure (13). Other turbine configurations, such as downwind, 2 bladed, vertical axis or columnar turbines can be substituted for the conventional three bladed upwind turbine shown.

Horizontal Wind Turbine Blades (9)

In one example, turbine blades (9) are mounted to the Horizontal Wind Turbine Nacelle (10) and are of fixed or variable pitch as required to effect Horizontal Wind Turbine Nacelle (10) rotation for the capture of power from the passing wind.

Horizontal Wind Turbine Nacelle (10)

In one example, a nacelle (10) acts as the central hub for the Horizontal Wind Turbine Blades (9) and a housing for the electrical generator to which it is attached by a rotating shaft. In one example, the Horizontal Wind Turbine Nacelle (10) also includes a gearbox, power conditioning and control elements as required by the particular turbine system design utilized for the Integrated Offshore Renewable Energy Floating Platform.

Direct Drive Small Diameter Wind Turbine (11)

In one example, a Direct Drive Small Diameter Wind Turbine (11) is mounted to the Deck Structure (13) occupying the air space below the swept diameter of the major Horizontal Wind Turbine Blades (9). Given the relatively compact dimension of the Direct Drive Small Diameter Wind Turbine (11), in one example, there is space available on the Deck Structure (13) for at least four (4) and possibly eight (8) units. In one example, the Direct Drive Small Diameter Wind Turbine (11) is based upon a straight shaft rotating linkage to the attached electrical generator and no gearbox assembly is used as part of the power system.

Helideck Access (12)

In one example, a Helideck Access structure (12) is attached as a cantilever from the Deck Structure (13) and is designed to accommodate a conventional helicopter as typically used for personnel transport in the offshore energy industry.

Deck Structure (13)

In one example, the Deck Structure (13) acts as the central foundation for the various renewable energy capture systems hosted aboard the Integrated Offshore Renewable Energy Floating Platform. The configuration lends itself to modular outfitting of various renewable energy devices and the ancillary systems required to support their operation and maintenance. In one example, the Deck Structure hosts an Articulated-Spar-Leg (18) attachment point a Freely Rotating Joint (5).

Mooring Lines (14)

In one example, Mooring Lines (14) are utilized to hold the Integrated Offshore Renewable Energy Floating Platform (100) on the installed location and, in one example, are attached between the Deck Structure (13) and the seabed anchor points. In one example, Mooring Lines (14) are also used to convey tension into the Mooring Energy Capture Devices (7). In one example, Mooring Lines (14) may be comprised of wire and/or synthetic rope, chain or a combination thereof.

Extendable Mount for Flow Energy Converter (15)

In one example, a Flow Energy Converter (1) is mounted to the lower end of Articulated-Spar-Legs (18) and is attached via an extendable device (15) which allows for increasing the offset between the Flow Energy Converter (1) and the lower end of the Spar Hull(s) (3) to provide for a larger lateral deflection of the device for the same swept angle of rotation of the Articulated-Spar-Legs (18) about the Center of Rotation (5). These can be raised into the Articulated-Spar-Legs (18) during construction, transport, or at sea for repair.

Point Absorber Wave Energy Capture Devices (16)

In one example, one or more point absorber wave energy capture devices (16) are suspended from the lower side of the deck structure (13) into the surface of the sea for capture of energy due to passing waves. These can be raised into the topsides during construction, transport, or at sea for repair.

Surface Flow Energy Converters (17)

In one example, surface flow energy converters (17) are suspended from the lower side of the deck structure (13) into the surface of the sea for capture of energy due to flowing sea currents. These can be raised into the topsides during construction, transport, or at sea for repair.

Articulated-Spar-Legs (18)

In one example, the platform leg assembly (18) is comprised of the combination of the Flow Energy Converter (1), Ballast (2), Spar Hull(s) (3), Oscillating Water Column Wave Energy Capture (4) and Freely Rotating Joint (5), acting together as one (integrated) unit, of which, in one example, the integrated offshore renewable energy floating platform may contain at least three (3) or more such assemblies as part of the overall system.

In one example, an articulated spar leg (18) has an elongate body or hull. The body or hull (3) has a first articulating end and a second sinkable end. The first articulating end, in one example, is called an upper or top end and has a freely rotating joint (5) affixed thereon. The second sinkable end, in one example, is called the bottom or lower end. This terminology may be used even though the articulated spar leg is positioned in a horizontal position. In one example, a mechanical device 50 secures the articulated spar leg when in the horizontal position.

Six Leg Deck Structure (19)

In one example, to increase deck load capacity compared to the four Articulated-Spar-Leg example shown in FIG. 1, a six leg configuration (19) is illustrated.

Four Leg Structure (20)

In one example, a four Articulated-Spar-Leg deck structure (20) is shown, which corresponds to the deployed illustration shown in FIG. 1.

Minimal Three Leg Structure (21)

In one example, a minimal deck structure (21) required for a stable platform using three Articulated-Spar-Legs is shown.

Horizontal Articulated-Spar-Leg (22)

In one example the Articulated-Spar-Leg (22) is shown in the horizontal position which is used for construction and transport of the platform.

Horizontal Articulated-Spar-Leg Center of Gravity (23)

In one example, by virtue of various ballast tanks within the Articulated-Spar-Leg the center of gravity (23) is located approximately mid-length and towards the lower portion of the horizontal Articulated-Spar-Leg.

Vertical Articulated-Spar-Leg (24)

In one example, the Articulated-Spar-Leg (23) is shown in the deployed vertical position, which is used to support the platform once on station and ready to produce power.

Vertical Articulated-Spar-Leg Center of Gravity (25)

In one example, by virtue of various ballast tanks within the Articulated-Spar-Leg (18) the center of gravity (25) is located towards the section of the Articulated-Spar-Leg furthest from the Rotating Joint (5).

Oscillating Water Column Device Air Vents (26)

In one example, in the topmost portion of the Articulated-Spar-Leg (18) just below the Rotating Joint (5) are vents (26) that when opened allow the free passage of air caused by the passing waves entering the sea chest (27).

Sea Chest (27)

In one example, a sea chest (27) with one or more openings is located below the water line 40. These are closed via mechanical doors during construction and transport and opened once the Articulated-Spar-Leg (18) is deployed in the vertical position (23).

Ocean Flow Energy Device (1) in Stowed Configuration (28)

In one example, the Ocean Flow Energy Device (1) is raised into the Articulated-Spar-Leg (18) to provide protection to the device during construction and transport.

Six Leg Deck Structure with Articulated-Spar-Legs in Horizontal Configuration (29)

The Deck Structure (13) and Topside (6) and Articulated-Spar-Legs Assemblies (18) only are shown for clarity.

Four Leg Deck Structure with Articulated-Spar-Legs in Horizontal Configuration (30)

The Deck Structure (13) and Topside (6) and Articulated-Spar-Legs Assemblies (18) only are shown for clarity.

Three Leg Deck Structure with Articulated-Spar-Legs in Horizontal Configuration (31)

The Deck Structure (13) and Topside (6) and Articulated-Spar-Legs Assemblies (18) only are shown for clarity.

DETAILED DESCRIPTION—EXAMPLES OF MODES OF OPERATION

In one example, disclosed is a method for deploying a spar-type hull used as a leg assembly for supporting a platform, by: initiating the spar-type hull in a horizontal orientation, releasing the spar-type hull from the fixed horizontal position by adding ballast via flooding a portion of the spar-type hull, rotating the spar-type hull towards a vertical position, and stopping the addition of ballast at a pre-determined volume with the Articulated-Spar-Leg in a stable vertical orientation.

In one example, disclosed is a method for deploying a spar-type hull from a horizontal to a vertical position, the Articulated-Spar-Leg (spar-type hull) being attached via an articulating or rotating joint and used as a leg assembly for supporting a floating platform, by: arranging variable ballast within the spar-type hull about the geometric center of the spar-type hull, distributed by means of pumps when movement is required; releasing the spar-type hull from the horizontal position; flooding a portion of the spar-type hull where configured as a ballast tank resulting in the rotation of the spar-type hull towards a vertical position; releasing the spar-type hull to rotate downward and away from the plane of the deck under the force of gravity; and opening the sea chest doors once fully deployed.

In one example, disclosed is a method for raising an Articulated-Spar-Leg (18) from a vertical to a horizontal position, the Articulated-Spar-Leg (18) being used as a leg assembly for supporting a floating platform attached via an articulating or rotating joint, by: moving the ballast weight towards the rotating joint using transfer pumps; securing the ballast weight within the spar-type hull proximate to the geometric center of the spar-type hull by means of tanks designed for such purpose; connecting one or more winches via cables to the free end of the Articulated-Spar-Leg (18), whereby the Articulated-Spar-Leg (18) is capable of being guided into a determined horizontal position; displacing ballast water from a portion of the Articulated-Spar-Leg (18) resulting in the rotation of the Articulated-Spar-Leg (18) towards a horizontal position; and securing the Articulated-Spar-Leg (18) to the floating platform in a horizontal position by a third mechanical means.

In one example, disclosed is a method for capturing the energy in the Articulated-Spar-Leg used as platform leg assembly restrained from linear motion in the XYZ Planes at the point of connection to the deck structure, but free in rotation in the XY axis about the same point resulting in significant relative motion of the lower submerged end of the leg; whereby an ocean flow energy device installed at the lower extremity of the spar-type hull is exposed to significant apparent water flow velocities. In a further example, also lowering the ocean flow energy device beyond the base of the platform leg assembly by mechanical means, increasing the magnitude of the swept arc at the lower end of the Articulated-Spar-Leg about the center of rotation located at the Rotating Joint.

In one example, the platform type is based on three or more Spar Hulls acting as Platform Leg Assembly(ies) attached via a Freely Rotating Joint allowing unrestrained rotation of the Platform Leg Assembly(ies) relative to a Deck Structure that provides a stable platform and protective space for equipment; and is designed to support a horizontal-axis or vertical-axis wind turbine.

In one example, disclosed is a method for reducing the draft of a floating platform by locating freely rotating joints on the extremities of the deck structure and with centers of rotation below the deck structure so that rotation of the Articulated-Spar-Legs to a fully horizontal plane is possible.

In one example, disclosed is a method for capturing wave energy using an Articulated-Spar-Leg design containing an oscillating water column wave energy capture device in the upper most portion of the Articulated-Spar-Leg, with the bottom portion of the oscillating water column wave energy capture device open to the sea, below the mean water line of the Articulated-Spar-Leg when in the vertical position.

In one example, disclosed is a method for capturing the energy of the motion of a platform relative to its seabed mooring point via either a spring and flywheel or linear generator, where such energy capture systems are installed at the point where the mooring lines are attached to a deck structure of the platform.

In one example, disclosed is a method for capturing wave energy using one or more wave energy capture devices mounted below a deck of a platform, on a platform that by means of a mechanical arm may be lowered and raised in a manner that the interaction with ocean wave height and wave period may be optimized when in lowered position, while fully protected by the deck structure in the raised position.

In one example, disclosed is a method for capturing ocean flow energy using one or more ocean flow energy capture devices mounted below a deck of a platform, on a platform that by means of a mechanical arm may be lowered and raised in a manner that captures the maximum ocean current available for flow energy capture devices when in the lowered position, while fully protected by the deck structure in the raised position.

In one example, disclosed is a method of combining several disparate marine energy technologies into an integrated system thereby increasing the system reliability and availability; concurrently adjusting the specific technology mix to the local meteorological and oceanographic conditions by virtue of a modular design that will allow industrial production of the components while resulting in a customized design for each particular operating location.

In one example, where space allows further small to medium sized direct drive low profile wind energy devices are mounted on the top of the Deck Structure, in addition to the high-profile conventional horizontal or vertical axis wind turbine.

In one example, disclosed is a unique feature of the design that allows the Platform Leg Assembly(ies) to be raised by rotation in a plane parallel to the face of the Deck Structure, and by virtue of the location of the attachment points to the Deck Structure the legs may or may not extend past the Deck Structure, resulting in the following:

a) With the Leg Assemblies in the fully raised position the platform can be assembled at dockside and all equipment pre-commissioned in port;

b) In the Platform Leg Assembly(ies) fully raised configuration the Deck Structure sits lower and has less freeboard than when in operation, facilitating the installation of the Wind Tower, Nacelle, and Turbine Blades;

c) Once the Platform Leg Assembly(ies) are lowered into their operational configuration, oriented 90 degrees relative to the plane of the Deck Structure, and ballasted to the operational depth, the freeboard distance is increased and the Nacelle elevation is higher which increases the amount of available wind resource; and d) In the event major overhaul or upgrades are required, the deployment and erection process is reversible, allowing the Leg Assembly(ies) to be raised and the entire Integrated Renewable Energy Floating Platform to be towed back to port.

In one example, the device as arranged, configured, and designed has an availability and reliability much greater than a wind turbine alone due to the independent nature of each energy subsystem.

In one example, the device energy storage is incorporated into the Deck Structure and the Platform Leg Assembly(ies).

In one example, disclosed is a method for deploying an Articulated-Spar-Leg used as a type of hull from a horizontal to a vertical position, the Articulated-Spar-Leg being attached via an articulating or rotating joint to a deck structure and used as a leg assembly for supporting a floating platform, the method comprising the steps of: moving a portion of a ballast within the Articulated-Spar-Leg from the lower half of the horizontal Articulated-Spar-Leg to a section of the Articulated-Spar-Leg farthest from the articulated joint, the Articulated-Spar-Leg being secured by a first mechanical means from movement until release is required; releasing the Articulated-Spar-Leg from the horizontal position, and; flooding an additional portion of the Articulated-Spar-Leg configured as a variable ballast tank resulting in the rotation of the Articulated-Spar-Leg to a vertical position. In a further example, also allowing open access of seawater to a first upper portion of the Articulated-Spar-Leg in the vertical position, the Articulated-Spar-Leg further comprising an oscillating water column wave energy capture device in an upper most portion of the Articulated-Spar-Leg, with the bottom portion of the oscillating water column wave energy capture device open to the sea, below a mean water line of the Articulated-Spar-Leg when in the vertical position.

In one example, disclosed is a method for raising the Articulated-Spar-Leg from a vertical to a horizontal position, the Articulated-Spar-Leg assembly being used for supporting a floating platform attached via an articulating or rotating joint, the method comprising the steps of: prohibiting open access of seawater to an upper portion of the Articulated-Spar-Leg; connecting one or more winches via cables to the free end of the Articulated-Spar-Leg, whereby the spar-type hull is capable of being guided into a determined horizontal position raising the Articulated-Spar-Leg towards the horizontal position while simultaneously pumping ballast from the lower section of the Articulated-Spar-Leg to tanks located nearer the articulated joint; displacing ballast water from a portion of the Articulated-Spar-Leg resulting in the rotation of the Articulated-Spar-Leg towards a horizontal position; and securing the Articulated-Spar-Leg to the floating platform in a horizontal position by a third mechanical means.

In one example, disclosed is a method for capturing the energy in the Articulated-Spar-Leg used as platform support assembly restrained from linear motion in the XYZ Planes at the point of connection to the deck structure, but free in rotation in along the XY axis about the same point resulting in significant relative motion of the lower submerged end of the leg; whereby an ocean flow energy device installed at the lower extremity of the Articulated-Spar-Leg is exposed to significant apparent water flow velocities. In a further example, also lowering the ocean flow energy device beyond the base of the platform leg assembly by mechanical means, increasing the magnitude of the arc described by the ocean flow energy device.

In one example, disclosed is a method for adjusting a floating platform deck size and weight capacity by changing the number of Articulated-Spar-Legs used as supports based on three or more Articulated-Spar-Legs acting as platform leg assembly(ies) attached via a freely rotating joint allowing unrestrained rotation of the platform leg assembly(ies) relative to a deck structure.

In one example, disclosed is a method for reducing the draft of a floating platform having an articulated spar leg by locating a freely rotating joint on an extremity of the deck structure of the platform and with a center of rotation below the deck structure so that rotation of the Articulated-Spar-Leg to a fully horizontal plane is possible.

In one example, disclosed is a method for capturing the energy of the motion of a platform relative to its seabed mooring point via either a spring and flywheel or linear generator, where such energy capture systems are installed at the point where the mooring lines are attached to a deck structure of the platform.

In one example, disclosed is a method for capturing wave energy using one or more wave energy capture devices mounted below a deck of a platform, on a platform that by means of a mechanical arm that is lowered and raised in a manner that the interaction with ocean wave height and wave period may be optimized when in lowered position, while fully protected by the deck structure in the raised position.

In one example, disclosed is a method for capturing ocean flow energy using one or more ocean flow energy capture devices mounted on a platform that by means of a mechanical arm may be lowered in a manner that captures the maximum ocean current available for flow energy capture devices when in the lowered position, while fully protected by the deck structure in the raised position.

In one example, a method for capturing additional wind energy by use of additional small diameter wind turbines installed on the deck with the arc of the blade of the small wind turbine a minimum of 10 meter or one small wind turbine blade diameter, whichever is less, away from the wind tower and/or wind turbine blades.

CONCLUSION

The majority of offshore renewable energy structures rely on one, or at most, two modes of energy capture. The most common device used is a wind turbine. In some instances, a wave energy capture device or ocean current energy device are combined with the wind turbine. The proposed configuration is a system that is designed to capture wind, wave, ocean current energy, and where conditions allow include ocean thermal energy conversion (commonly referred to as OTEC) integrated into one floating offshore platform. Key to the design are the Articulated-Spar-Legs that allow construction in shallow ports, yet provide a stable platform once deployed.

The design is based on a building block principle, or modularity that incorporates existing technologies in a novel way allowing flexibility in system selection for each platform to be optimized for the site-specific conditions to maximize power outputs hence revenue capture.

In summary, herein disclosed are particular structural means for positioning and arranging one or more different energy capture devices in a modular fashion, forming an offshore renewable energy floating platform. Means are provided for pre-assembled deployment of the floating platform with spar-type hull supports. Means are provided for articulating the preassembled Articulated-Spar-Legs into configurations for assembly, transport, and deployment. Means are provided for modularly receiving one or more different energy capture devices into or onto a Articulated-Spar-Legs supported platform.

The foregoing description is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant structural or mechanical art. Further, the embodiments described are also intended to enable others skilled in the art to utilize the invention and such or other embodiments and with various modifications required by the particular applications or uses of the invention.

What is claimed is:

1. A method for deploying an Articulated-Spar-Leg used as a type of hull from a horizontal to a vertical position, the Articulated-Spar-Leg being attached via an articulating or rotating joint to a deck structure and used as a leg assembly for supporting a floating platform, the method comprising the steps of:
   moving a portion of a ballast within the Articulated-Spar-Leg from the lower half of the horizontal Articulated-Spar-Leg to a section of the Articulated-Spar-Leg farthest from the articulated joint, the Articulated-Spar-Leg being secured by a first mechanical means from movement until release is required;
   releasing the Articulated-Spar-Leg from the horizontal position, and;

flooding an additional portion of the Articulated-Spar-Leg configured as a variable ballast tank resulting in the rotation of the Articulated-Spar-Leg to a vertical position.

2. The method of claim 1 further comprising the step of allowing open access of seawater to a first upper portion of the Articulated-Spar-Leg in the vertical position, the Articulated-Spar-Leg further comprising an oscillating water column wave energy capture device in an upper most portion of the Articulated-Spar-Leg, with the bottom portion of the oscillating water column wave energy capture device open to the sea, below a mean water line of the Articulated-Spar-Leg when in the vertical position.

3. The method of claim 1 comprising a method for reducing the draft of a floating platform having an articulated spar leg by locating a freely rotating joint on an extremity of the deck structure of the platform and with a center of rotation below the deck structure so that rotation of the Articulated-Spar-Leg to a fully horizontal plane is possible.

\* \* \* \* \*